US012318645B2

(12) United States Patent
Tomiyama et al.

(10) Patent No.: US 12,318,645 B2
(45) Date of Patent: Jun. 3, 2025

(54) FIRE EXTINGUISHER

(71) Applicant: YAMATO PROTEC CORPORATION, Tokyo (JP)

(72) Inventors: Shogo Tomiyama, Inashiki-gun (JP); Tatsuki Endo, Inashiki-gun (JP); Wataru Kobayashi, Inashiki-gun (JP)

(73) Assignee: YAMATO PROTEC CORPORATION, Tokyo (JP)

( * ) Notice: Subject to any disclaimer, the term of this patent is extended or adjusted under 35 U.S.C. 154(b) by 439 days.

(21) Appl. No.: 17/272,406

(22) PCT Filed: Sep. 2, 2019

(86) PCT No.: PCT/JP2019/034401

§ 371 (c)(1),
(2) Date: Mar. 1, 2021

(87) PCT Pub. No.: WO2020/050209

PCT Pub. Date: Mar. 12, 2020

(65) Prior Publication Data

US 2021/0331013 A1 Oct. 28, 2021

(30) Foreign Application Priority Data

Sep. 4, 2018 (JP) ................................ 2018-165072

(51) Int. Cl.
*A62C 5/00* (2006.01)
*A62C 99/00* (2010.01)

(52) U.S. Cl.
CPC .......... *A62C 5/006* (2013.01); *A62C 99/0018* (2013.01)

(58) Field of Classification Search
CPC ..... A62C 99/0018; A62C 5/006; A62C 35/02; A62C 35/00; A62C 35/023; A62C 3/07;
(Continued)

(56) References Cited

U.S. PATENT DOCUMENTS 5,588,493 A * 12/1996 Spector ................. A62C 5/006 252/6
6,948,567 B1 * 9/2005 Cyphers ................ A62C 35/02 169/58

(Continued)

FOREIGN PATENT DOCUMENTS

JP 52-12719 A 1/1977
JP 53-117714 U 9/1978

(Continued)

OTHER PUBLICATIONS

International Search Report dated Oct. 21, 2019, issued in counterpart International Application No. PCT/ JP2019/034401 (2 pages).

*Primary Examiner* — Christopher R Dandridge
(74) *Attorney, Agent, or Firm* — WHDA, LLP

(57) ABSTRACT

The present invention provides a fire extinguisher capable of easily installing a thinly molded fire extinguishing agent. A fire extinguisher of the present invention comprises a fire extinguishing agent layer that generates aerosol by combustion, a first plate covering a first surface of the fire extinguishing agent layer and having a blowout aperture for the aerosol, and a second plate covering a second surface of the fire extinguishing agent layer, which is opposite to the first surface. An edge of the first plate and an edge of the second plate may be connected to each other. And, a peripheral wall extending toward the second plate may be provided at the edge of the first plate.

15 Claims, 6 Drawing Sheets

(58) Field of Classification Search
CPC ........... A62C 3/16; A62C 3/00; A62C 3/0235; A62C 13/00; A62C 31/00
USPC ........................................................... 169/46
See application file for complete search history.

(56) References Cited

U.S. PATENT DOCUMENTS

| | | | | | |
|---|---|---|---|---|---|
| 7,905,296 | B2 * | 3/2011 | Bennett | A62C 3/07 169/49 |
| 2011/0297402 | A1 * | 12/2011 | Belmonte | A62C 35/10 169/56 |

FOREIGN PATENT DOCUMENTS

| | | | | | |
|---|---|---|---|---|---|
| JP | 1-256640 | A | | 10/1989 | |
| WO | 2017/134703 | A1 | | 8/2017 | |
| WO | 2017/187792 | A1 | | 11/2017 | |
| WO | WO-2017209202 | A1 | * | 12/2017 | A62C 3/16 |
| WO | WO2018012503 | | * | 1/2018 | A62C 13/003 |
| WO | WO-2018012503 | A1 | * | 1/2018 | A62C 13/003 |

* cited by examiner

[FIG. 1]
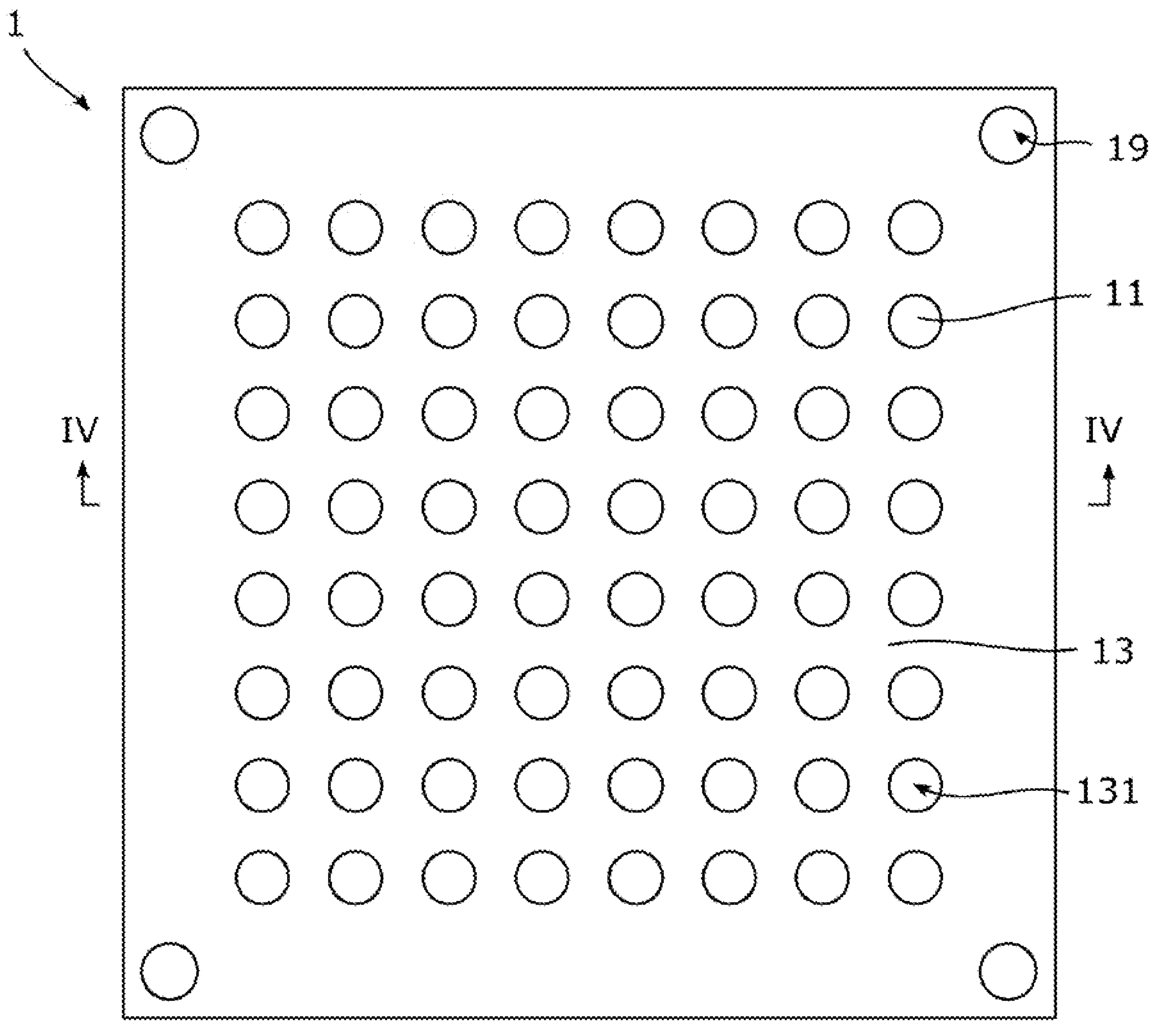
[FIG. 2]
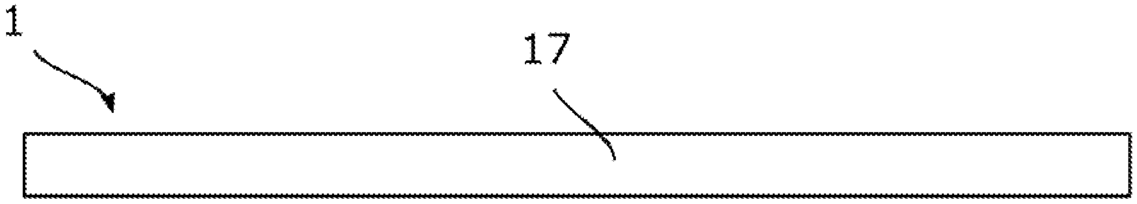

[FIG. 3]
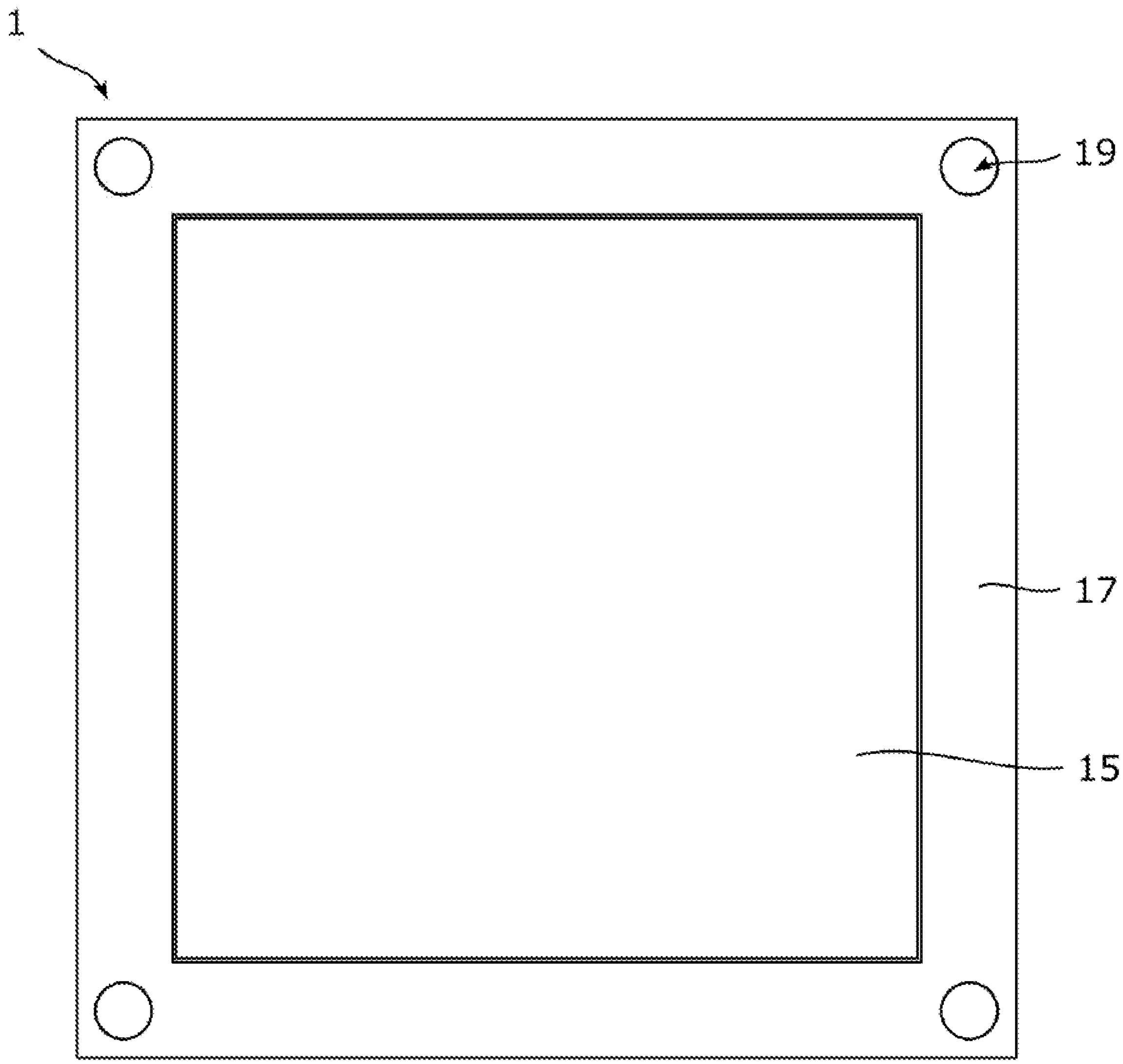
[FIG. 4]
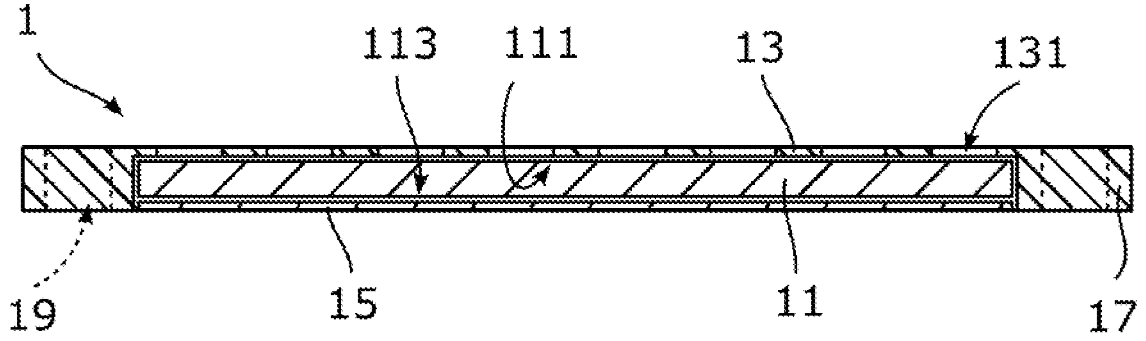

[FIG. 5]
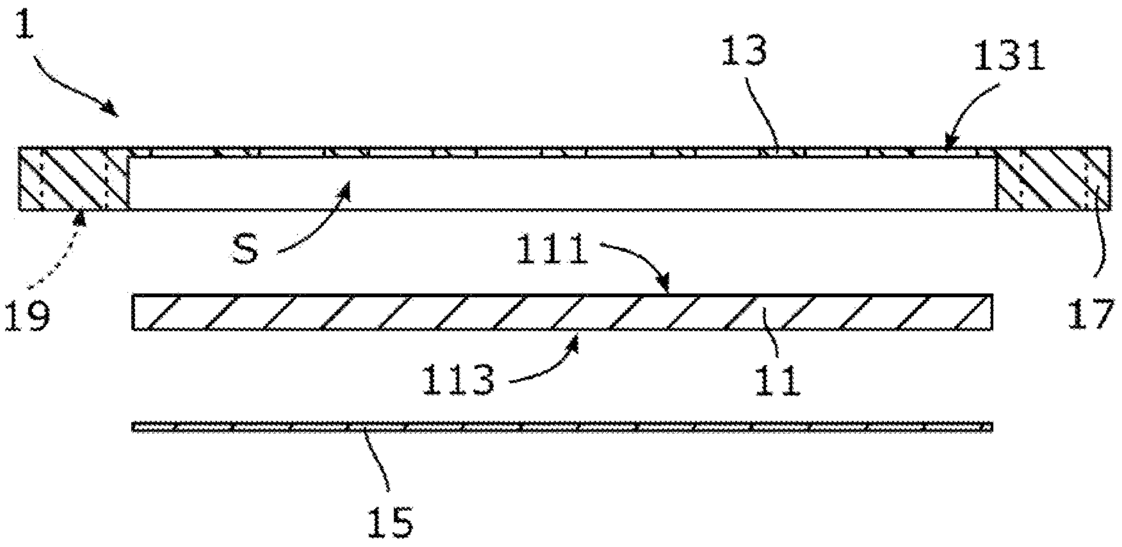
[FIG. 6]
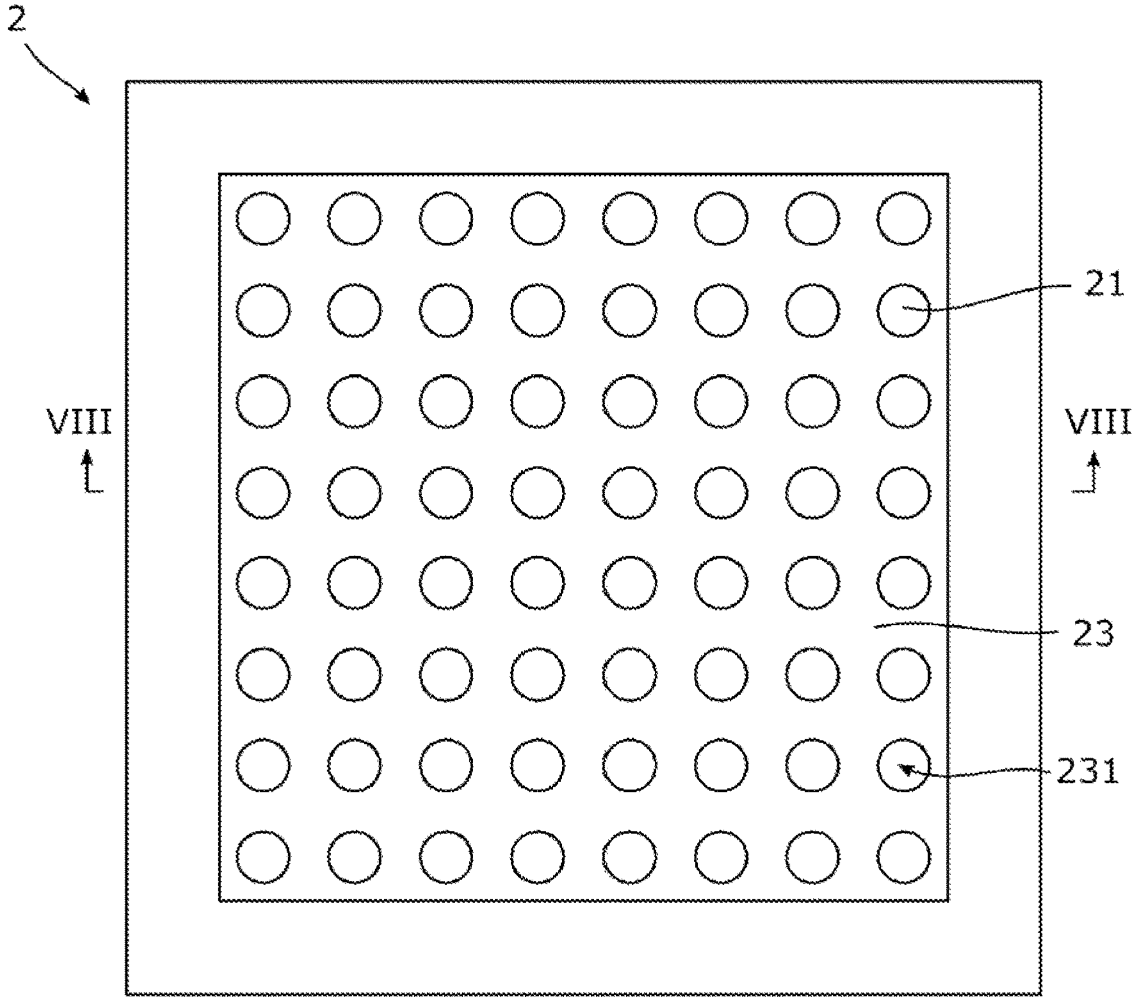

[FIG. 7]
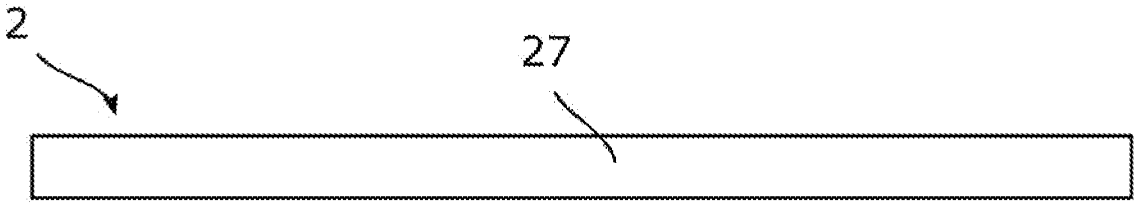
[FIG. 8]
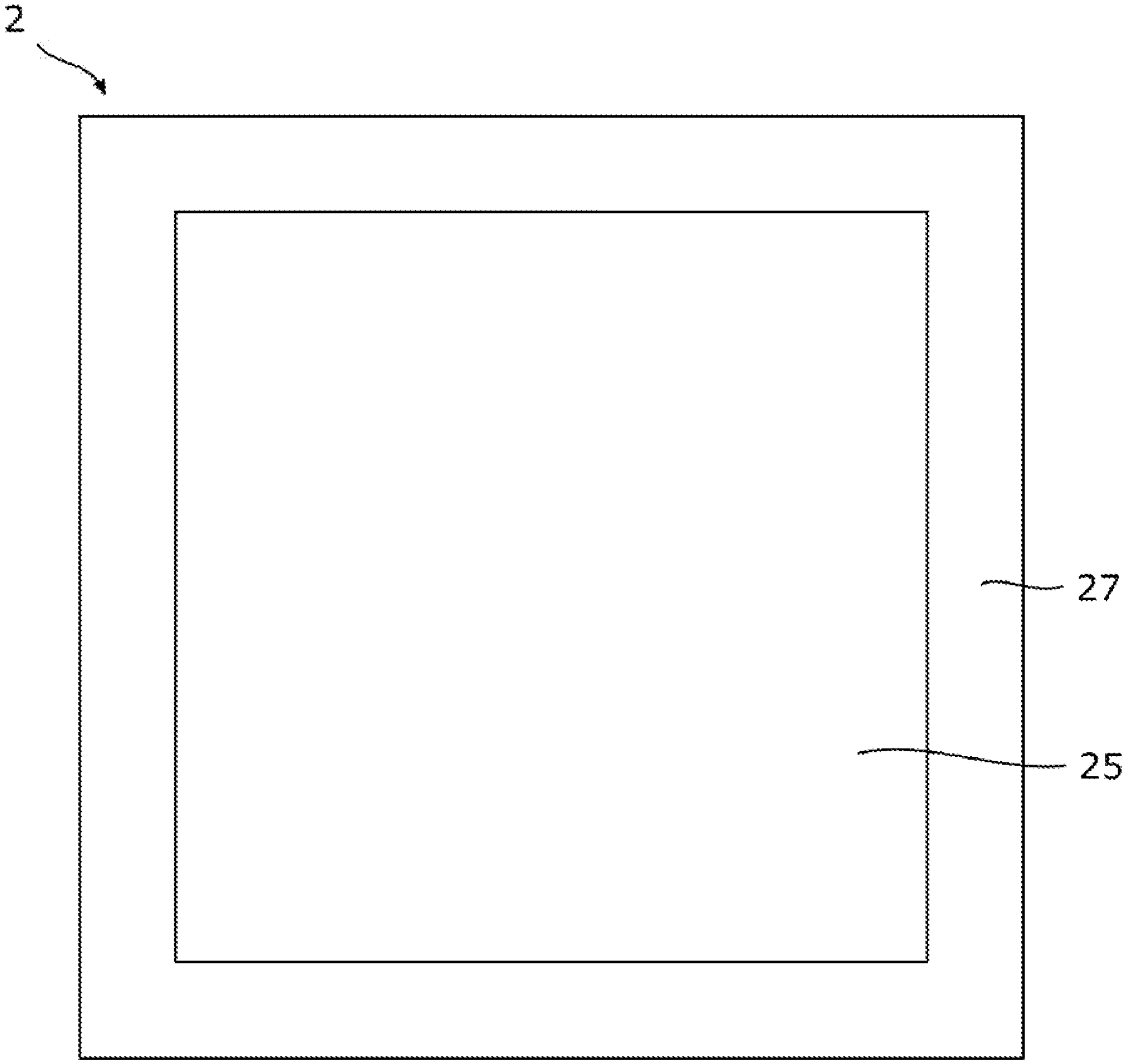

[FIG. 9]
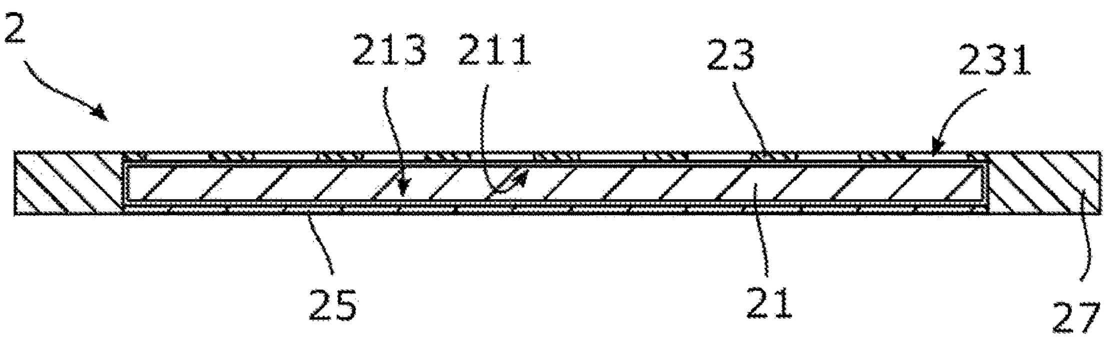
[FIG. 10]
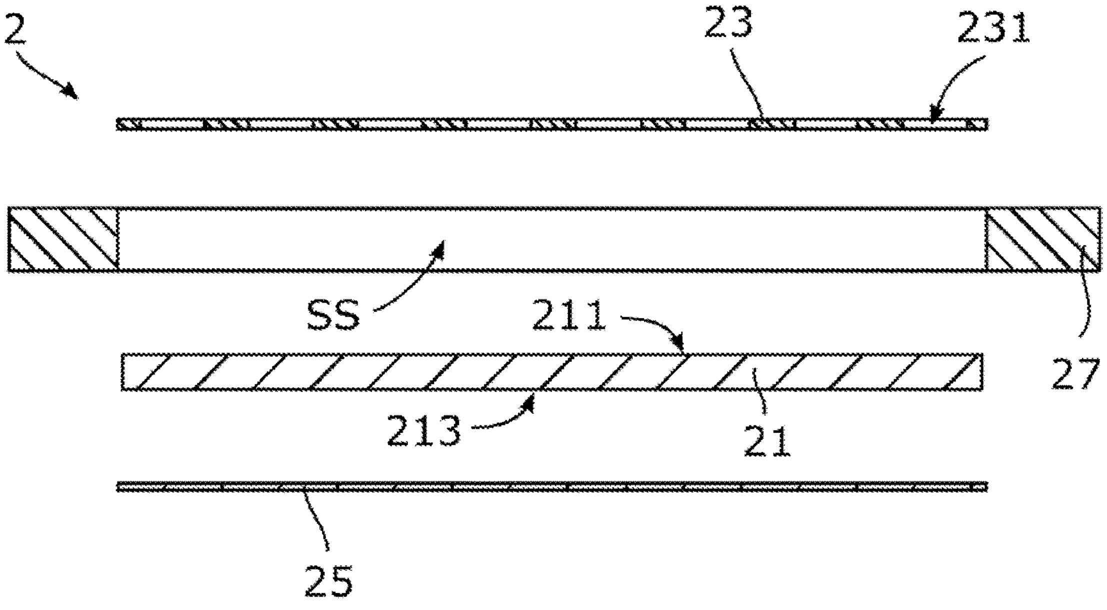
[FIG. 11]
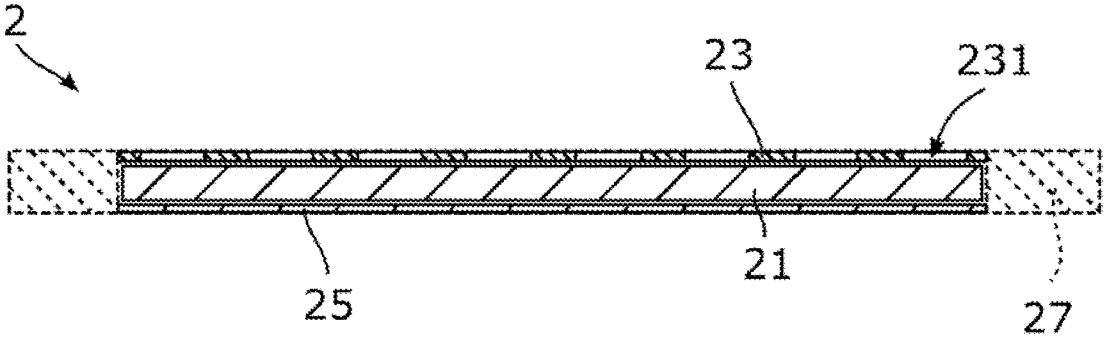

[FIG. 12]
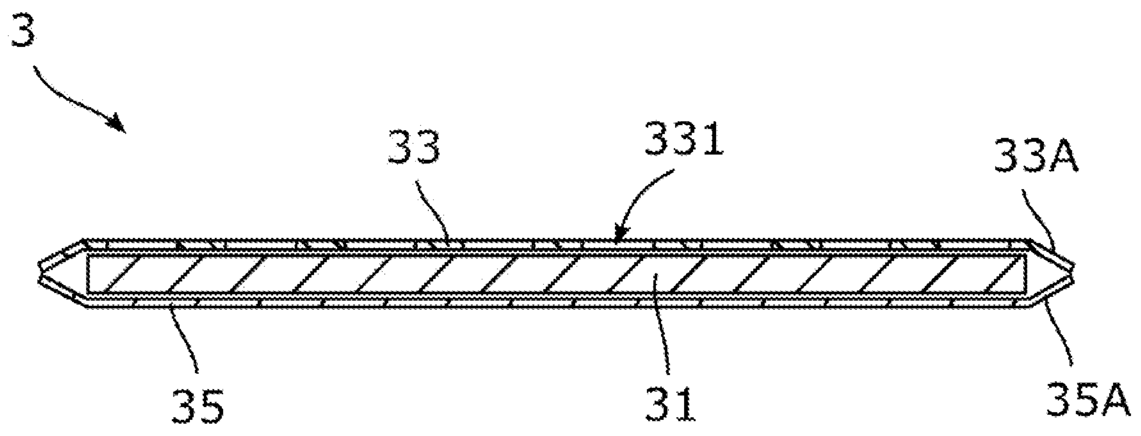
[FIG. 13]
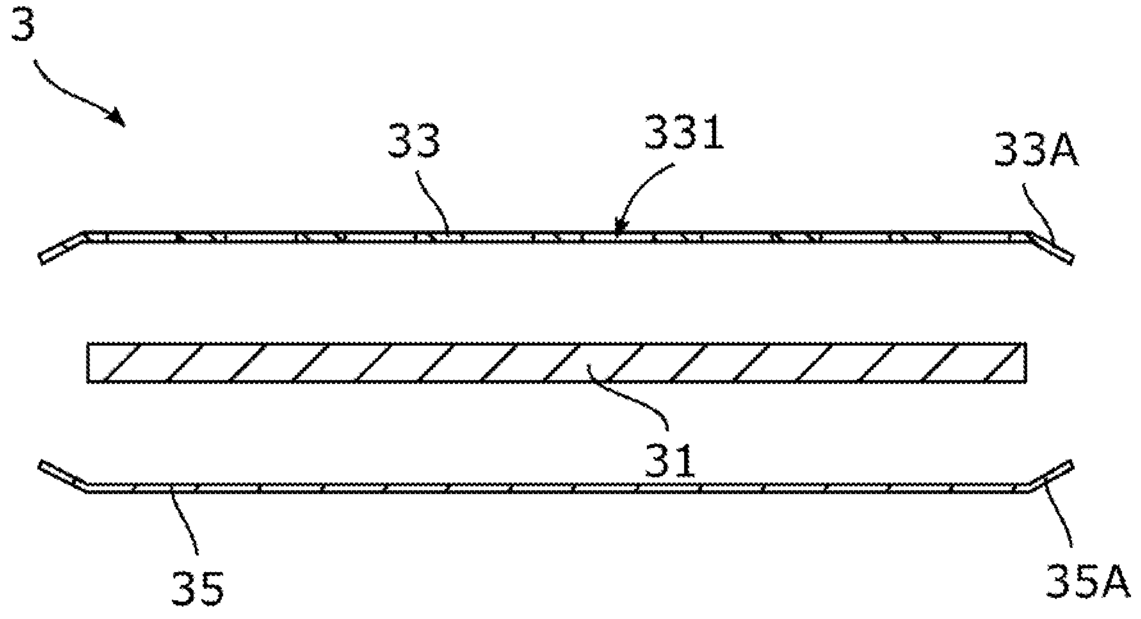

FIRE EXTINGUISHER

TECHNICAL FIELD

The present invention relates to a fire extinguisher that extinguishes or suppresses a flame by generating aerosol by combustion.

BACKGROUND OF THE INVENTION

A fire extinguishing agent composition for generating an aerosol by combustion to extinguish or suppress fire is known (for example, Patent Literature 1). Such a fire extinguishing agent composition can be used, for example, as liquid form such as dispersion, or as solid form such as powder or molded product having a desired shape.

PRIOR ART DOCUMENTS

Patent Literature

Patent Literature 1: WO 2017/134703 A

SUMMARY OF INVENTION

Problem to be Solved by the Invention

For example, a fire extinguishing agent composition molded thinly like a sheet is considered to have high convenience because it can be installed in a limited space. However, with respect to such a form of the fire extinguishing agent, it is necessary to design separately for installation such as shape retention.

Therefore, an object of the present invention is to provide a fire extinguisher capable of easily installing a thinly molded fire extinguishing agent.

Means to Solve the Problem

In order to solve the above-mentioned problems, the present invention provides a fire extinguisher comprising a fire extinguishing agent layer that generates aerosol by combustion, a first plate covering a first surface of the fire extinguishing agent layer and having a blowout aperture for the aerosol, and a second plate covering a second surface of the fire extinguishing agent layer, which is opposite to the first surface.

In the fire extinguisher of the present invention having the above-described configuration, it is preferable that an edge of the first plate and an edge of the second plate is connected to each other.

Further, in the fire extinguisher of the present invention having the above-described configuration, it is preferable that a peripheral wall extending toward the second plate is provided at the edge of the first plate.

In the fire extinguisher of the present invention having the above-described configuration, it is preferable that the first plate and the peripheral wall are made of a metal material or a resin material.

Further, in the fire extinguisher of the present invention having the above-described configuration, it is preferable that further comprises a fixing means for fixing the fire extinguisher to a desired mounting location.

Further, in the fire extinguisher of the present invention having the above-described configuration, it is preferable that the fire extinguishing agent layer contains potassium chlorate and a fire extinguishing agent having a DSC evaluation (100 to 400° C., 10° C. per minute temperature rise) and a total endothermic peak amount of 100 J/g to 900 J/g.

Effect of the Invention

In accordance with the present invention, it is possible to easily install a thinly molded fire extinguishing agent.

BRIEF DESCRIPTION OF THE DRAWINGS

FIG. 1 is a front view showing the outline of the fire extinguisher 1 relating to the first embodiment of the present invention.

FIG. 2 is a top view of the fire extinguisher 1.

FIG. 3 is a rear view of the fire extinguisher 1.

FIG. 4 is a cross-sectional view taken along line IV-IV of FIG. 1.

FIG. 5 is an exploded view which shows one example of assembling method of the fire extinguisher.

FIG. 6 is a front view showing the outline of the fire extinguisher 2 relating to the second embodiment of the present invention.

FIG. 7 is a top view of the fire extinguisher 2.

FIG. 8 is a rear view of the fire extinguisher 2.

FIG. 9 is a cross-sectional view taken along line VIII-VIII of FIG. 6.

FIG. 10 is an exploded view which shows one example of the assembling method of the fire extinguisher 2.

FIG. 11 is an exploded view which shows the other example of the assembling method of the fire extinguisher 2.

FIG. 12 is a front view showing the outline of the fire extinguisher 3 relating to the third embodiment of the present invention.

FIG. 13 is an exploded view which shows one example of the assembling method of the fire extinguisher 3.

EMBODIMENTS FOR ACHIEVING THE INVENTION

Hereinafter, some of embodiments of the present invention will be described in detail with reference to the drawings. However, the present invention would not be limited to those drawings. Further, since the drawings are for conceptually explaining the present invention, dimensions of the respective constituent elements expressed and ratios thereof may be different from actual ones for easy understanding.

In the fire extinguisher disclosed below, the fire extinguishing agent layer (substantially a sheet-shaped fire extinguishing agent) housed in a housing ignites at a predetermined temperature to generate an aerosol, and the generated aerosol is ejected from apertures to extinguish or suppress the fire. The fire extinguisher is preferably attached, for example, in a closed space containing combustible materials or in the vicinity of equipment that may cause ignition. Examples of the former include electrochemical devices (storage batteries, capacitors, etc.), electronic devices and power generation equipment. (nacelles of wind power generation system, etc.), containers (trash box, etc.), and the like. Further, examples of the latter include a charger and a contact terminal. In other words, the fire extinguisher is so designed as to be installed in a limited space.

1. First Embodiment

The fire extinguisher in accordance with the first embodiment will be described with reference to FIG. 1 to FIG. 5.

The fire extinguisher 1 in accordance with the present embodiment includes a fire extinguishing agent layer 11, plates 13, 15 and a peripheral wall 17. The plates 13 and 15 and the peripheral wall 17 of these components constitute a fire extinguishing agent container.

The fire extinguisher 1 and the fire extinguishing agent container have a thin shape as a whole as shown in FIG. 2 so as to be installed in a limited space. The dimensions of the fire extinguisher 1 may be designed in accordance with the installation space and the required fire extinguishing performance, and for example, when the thickness of the fire extinguishing agent layer 11 is about 2 mm, the thickness of the fire extinguisher 11 may be about 3 mm.

The components of the fire extinguisher 1 will be described. The fire extinguishing agent layer 11 is a chemical agent that generates an aerosol by combustion, and is molded in a sheet shape. Here, the sheet shape means, for example, that the fire extinguishing agent has a thickness (thinness) that cannot maintain its shape due to its own weight when it is held horizontally, or has a thickness that cannot stand on its own when the peripheral surface is grounded. Therefore, the fire extinguishing agent layer 11 has a surface 111 corresponding to the first surface and a surface 113 corresponding to the second surface opposite to the first surface. The fire extinguishing agent layer 11 may have a shape that is continuous over the entire surface or a shape that has a partially discontinuous portion.

In the present embodiment, the fire extinguishing agent layer 11 has a rectangular shape corresponding to the shape of the storage space S (see FIG. 5), but may have a circular shape or other shape. The dimensions of the fire extinguishing agent layer 11 are, for example, about 40 mm in length and width, and about 2 mm in thickness. The composition of the fire extinguishing agent constituting the fire extinguishing agent layer 11 will be described later.

As shown in FIG. 4, the plate 13 is a plate member that covers the surface 111 of the fire extinguishing agent layer 11, and corresponds to the first plate. In the present embodiment, it is assumed that the plate 13 is made of a metal material such as stainless steel, iron, aluminum or an alloy thereof, but the plate 13 may be made of other material such as a resin. Further, it is preferable that the plate 13 can maintain its shape up to a temperature higher than the combustion start temperature of the fire extinguishing agent layer 11. Among them, the plate 13 is preferably made of a material such as SUS304, SUS302B, SUS316L, SUSXM15J1 from the viewpoint of processing, handling, price and heat resistance, and preferably has a thickness of 0.1 to 1.0 mm.

As shown in FIG. 1, the plate 13 has a blowout aperture 131 for aerosol generated from the fire extinguishing agent layer 11. In the present embodiment, the blowout aperture 131 is composed of a plurality of regularly arranged apertures, but the blowout aperture 131 may be one aperture or may be composed of a plurality of irregularly arranged apertures. Further, the individual aperture constituting the blowout aperture 131 is not limited to the circular shape, and may be, for example, a quadrangular shape or a cross shape. Therefore, the plate 13 can be configured as a perforated metal.

Next, as shown in FIG. 4, the plate 15 is a plate member that covers the surface 113 (the surface opposite to the surface 111) of the fire extinguishing agent layer 11, and corresponds to the second plate. Here, it is assumed that the plate 15 is made of a metal material like the plate 13, but may be made of other material such as resin. Further, the plate 15 may be provided with a blowout aperture for aerosol.

The plate 15 is attached to the peripheral wall 17 via a holding means (not shown). As the holding means, for example, there can be employed an adhesive tape, and a groove or a protrusion provided on the inner peripheral surface of the peripheral wall 17 which can engage with the outer edge of the plate 15.

As shown in FIG. 5, the peripheral wall 17 extends from the plate 13 toward the plate 15, and forms a storage space S for the fire extinguishing agent layer 11 between the plates 13 and 15. In the present embodiment, as shown in FIG. 3 and FIG. 4, the peripheral wall 17 is formed so as to cover the peripheral surfaces of the fire extinguishing agent layer 11 and the plates 13 and 15.

The storage space S is preferably closed except for the blowout aperture 131. As a result, the directivity of the aerosol ejected from the blowout aperture 131 is enhanced, and the flame can be effectively extinguished or suppressed.

In the present embodiment, for example, as shown in FIG. 5, the peripheral wall 17 is integrally molded with the plate 13. Therefore, the peripheral wall 17 is made of the same material as the plate 13 (that is, a metal material or a resin material).

The fire extinguisher 1 may also have a fixing means 19 for fixing the fire extinguisher 1 to a desired mounting location. In the present embodiment, as the fixing means 19, a screw aperture is assumed, but the fixing means 19 may be, for example, a double-sided tape or a hook. Further, the fire extinguisher 1 may be welded to the mounting location.

The fire extinguisher 1 having the above-described configuration is assembled by the following procedure.

As shown in FIG. 5, the plate 13 and the peripheral wall 17 integrated together is prepared. Next, the fire extinguishing agent layer 11 is stored in the storage space S. Then, the surface 113 of the fire extinguishing agent layer 11 is covered with the plate 15, and the plate 15 is held on the peripheral wall 17.

Then, the fire extinguisher 1 thus assembled in this manner is attached to a desired attachment location via the fixing means 19. At that time, it is preferable that the fire extinguisher 1 is installed so that the plate 13 having the blowout aperture 131 faces the expected fire source of the flame.

In accordance with the first embodiment, the shape of the fire extinguishing agent layer 11 formed thinly like a sheet can be easily maintained. Further, since the fire extinguisher 1 as a whole has a small thickness, it can be easily installed in a limited space.

Further, since the storage space S is closed except for the blowout aperture 19, the aerosol ejected from the blowout aperture 19 has a certain directivity. Therefore, the aerosol can be efficiently supplied to the fire source, which results in improvement in fire extinguishing performance.

Further, since the fire extinguishing agent layer 11 can be replaced by removing the plate 15, it is easy to replace the fire extinguishing agent layer 11 and maintain the fire extinguisher 1.

2. Fire Extinguishing Agent Composition

Here, the fire extinguishing agent (fire extinguishing agent composition) used for the fire extinguishing agent layer 11 of the present embodiment will be described. As the fire extinguishing agent composition, various ones belonging to or not belonging to the classification of explosives can be used.

The fire extinguishing agent in the present embodiment contains, for example, 20 to 50% by mass of a fuel (component A) and 80 to 50% by mass of a chlorate (component B), and further, contains 6 to 1000 parts by mass of a potassium salt (component C) with respect to 100 parts by mass of the total amount of the fuel and the chlorate, and has a thermal decomposition start temperature in the range of more than 90° C. to 260° C.

The fuel as the component A is a component for generating thermal energy by combustion together with the chlorate as the component B to generate an aerosol (potassium radical) derived from the potassium salt of the component C.

As the fuel for the component A, preferable is, for example, at least one selected from dicyandiamide, nitroguanidine, guanidine nitrate, urea, melamine, melamine cyanurate, avicel, guagam, sodium carboxylmethylcellulose, potassium carboxylmethylcellulose, ammonium carboxylmethylcellulose, nitrocellulose, aluminum, boron, and magnesium, magnalium, zirconium, titanium, titanium hydride, tungsten and silicon.

The chlorate of the component B is a strong oxidizing agent, and is a component for generating thermal energy by combustion together with the fuel of component A and generating an aerosol (potassium radical) derived from the potassium salt of component C.

As the chlorate of the component B, preferable is, for example, at least one selected from potassium chlorate, sodium chlorate, strontium chlorate, ammonium chlorate and magnesium chlorate is preferable.

Here, the content ratio of the fuel of the component A and the chlorate of the component B in the total 100% by mass is as follows.

Component A: 20 to 50% by mass,
 preferably 25 to 40% by mass,
 more preferably 25 to 35% by mass,
Component B: 80 to 50% by mass,
 preferably 75 to 60% by mass,
 more preferably 75 to 65% by mass.

Next, the potassium salt of the component C is a component for generating an aerosol (potassium radical) by the thermal energy generated by the combustion of the component A and the component B.

As the potassium salt for the component C, preferable is, for example, at least one selected from potassium acetate, potassium propionate, monopotassium citrate, dipotassium citrate, tripotassium citrate, monopotassium trihydrogen ethylenediaminetetraacetate, dipotassium dihydrogen ethylenediaminetetraacetate, tripotassium monohydrogen ethylenediaminetetraacetate, tetrapotassium ethylenediaminetetraacetate, potassium hydrogen phthalate, dipotassium phthalate, potassium hydrogen oxalate, dipotassium oxalate and potassium bicarbonate.

The content ratio of the C component is preferably 6 to 1000 parts by mass, and more preferably 10 to 900 parts by mass with respect to 100 parts by mass of the total amount of the component A and the component B.

Furthermore, the fire extinguishing agent composition of the present embodiment is a composition having a thermal decomposition start temperature in the range of more than 90° C. to 260° C., preferably more than 150° C. to 260° C. Such a range of the thermal decomposition start temperature can be adjusted by combining the above-mentioned component A, component B and component C in the above ratio.

When satisfying the above range of the thermal decomposition start temperature, in accordance with the fire extinguishing agent composition of the present embodiment, for example, without using an ignition device or the like, the component A and the component B can automatically be ignited and burned by receiving the heat at the time of the fire generation to generate an aerosol (potassium radical) derived from the component C, and then the fire can be extinguished.

Since the ignition temperature of woods, which are generally used as a combustible material in a room, is 260° C., when setting the thermal decomposition start temperature as a condition where it does not start at 90° C. or less, which is the general operating temperature of a heat detector of an automatic fire alarm system installed in a place where fire is handled, the fire can be extinguished quickly and the malfunction of the heat detector can be prevented. Particularly, since the maximum set temperature of the heat detector is 150° C., high availability can be obtained by setting the lower limit of the thermal decomposition start temperature to more than 150° C.

As an example of a method for molding the fire extinguishing agent, there is a method where mixing the above composition with a hinder, spread to a desired thickness, for example, with rollers and cut to a desired size. Alternatively, a mixture of the fire extinguishing agent composition and the binder may be applied to a support member such as a paper.

Here, specifical examples of the material of the binder include polyolefin resins such as a polypropylene-based resin, a polyethylene-based resin, a poly (1-)butene-based resin and a polypentene-based resin; thermoplastic resins such as a polystyrene-based resin, an acrylonitrile-butadiene-styrene-based resin, a methyl methacrylate-butadiene-styrene resin, ethylene-vinyl acetate resin, ethylene-propylene resin, a polycarbonate-based resin, a polyphenylene ether-based resin, an acrylic-based resin, a polyimide-based resin and a polyvinyl chloride-based resin; rubbers such as natural rubber (NR), isoprene rubber (IR), butadiene rubber (BR), 1,2-polybutadiene rubber (1,2-BR), styrene-butadiene rubber (SBR), chloroprene rubber (CR), nitrile rubber (NBR), butyl rubber (IIR), ethylene-propylene rubber (EPR, EPDM), chlorosulfonated polyethylene (CSM), acrylic rubber (ACM, ANM), epichlorohydrin rubber (CO, ECO), polysulfide rubber (T), silicone rubber (Q), fluororubber (FKM, FZ) and urethane rubber (U); thermosetting resins such as polyurethane resin, polyisocyanate resin, polyisocyanurate resin, phenol resin and epoxy resin; latexes of the above thermoplastic resins and the rubbers; emulsions such as thermoplastic resins and the rubbers; cellulose derivatives such as CMC (carboxymethyl cellulose), HEC (hydroxyethyl cellulose) and HPMC (hydroxypropyl methyl cellulose), and the like.

3. Second Embodiment

The fire extinguisher in accordance with the second embodiment will be described with reference to FIG. 6 to FIG. 11.

The fire extinguisher 2 in accordance with the present embodiment includes, for example, a fire extinguishing agent layer 21, plates 23, 25, and a peripheral wall 27, as shown in FIG. 9. The plates 23, 25 and the peripheral wall 27 constitute a fire extinguishing agent container. As shown in FIG. 7, the fire extinguisher 2 and the fire extinguishing agent container have a shape having a small thickness as a whole.

As the fire extinguishing agent layer 21, it is possible to use the same one as the fire extinguishing agent layer 11 of the first embodiment. The plate 25 may also be the same as the plate 15 of the first embodiment, for example, as shown in FIG. 8. However, the plate 25 may be detachably attached to the peripheral wall 27 or fixed to the peripheral wall 27 depending on the difference in the method of forming the peripheral wall 27, which is described later (see FIG. 10 and FIG. 11).

In the present embodiment, the plate 23 and the peripheral wall 27 are constituted as separate members. Therefore, the plate 23 can be easily manufactured by drilling the blowout apertures 231 in the plate material, for example, as shown in FIG. 6 and FIG. 9. Further, for example, as shown in FIG. 10, the peripheral wall 27 is a simple frame body, and a storage space SS for the fire extinguishing agent layer 21 is formed inside the inner peripheral surface of the peripheral wall 27.

The plates 23 and 25 are attached to the peripheral wall 27 (see FIG. 10). The peripheral wall 27 has holding means (not shown) for holding the plates 23 and 25, respectively. The holding means referred to here may be the same as the holding means for holding the plate 15 on the peripheral wall 17 in the first embodiment. The plates 23 and 25 are detachably attached to the peripheral wall 27 or fixed to the peripheral wall 27 depending on the difference of the holding means or of the method of forming the peripheral wall 27 described later (see FIGS. 10 and FIG. 11).

One example of an assembly method of the fire extinguisher 2 having such a constitution will be described with reference to FIG. 10. This assembly method is suitable when the peripheral wall 27 is provided as a frame body. Specifically, firstly, the fire extinguishing agent layer 21 is inserted into the storage space SS inside the peripheral wall 27. Next, the surfaces 211 and 213 of the fire extinguishing agent layer 21 are covered with the plates 23 and 25, respectively, and both the plates 23 and 25 are held on the peripheral wall 27. The order of inserting the fire extinguishing agent layer 21 and attaching the plates 23 and 25 can optionally be changed.

Further, the other assembling method of the fire extinguisher 2 will be described with reference to FIG. 11.

Firstly, the plate 23, the fire extinguishing agent layer 21, and the plate 25 are stacked in this order. Next, the peripheral wall 27 is formed by applying or winding the resin on the outer peripheral surface of the stacked members. Examples of the resin used here include modified polyphenylene ether (PPE) resin, polyimide resin, polycarbonate resin, polyethylene terephthalate (PET) resin, polybutylene terephthalate (PBT) resin, fluororesin, polyacetal (POM) resin, polyether imide (PEI) resin, polyether sulfone (PES) resin, polyphenylene sulfone (PPS) resin, liquid crystal polymer (LCP) resin, and the like.

In accordance with the second embodiment, as in the first embodiment, the thinly molded fire extinguishing agent layer 21 can be easily held and can be easily installed in a limited space. Furthermore, since each component has a simple shape, reduction in manufacturing cost can be expected.

4. Third Embodiment

The fire extinguisher in accordance with the third embodiment will be described with reference to FIG. 12 and FIG. 13.

As shown in FIG. 12, the fire extinguisher 3 in accordance with the present embodiment has a shape having a small thickness as a whole, and includes a fire extinguishing agent layer 31 and plates 33 and 35 which constitutes a container. As the fire extinguishing agent layer 31, it is possible to use the same one as the fire extinguishing agent layer 11 of the first embodiment.

The plate 33 has a blowout aperture 331 and is bent toward the plate 35 at the edge 33A. Further, the plate 35 is bent toward the plate 33 at the edge 35A. The materials of the plates 33 and 35 may be the same as the materials of the plates 13 and 15 of the first embodiment.

As shown in FIG. 13, the fire extinguisher 3 is manufactured by sandwiching the fire extinguishing agent layer 31 between the plates 33 and 35. The plates 33, 35 are connected to each other at the edges 33A, 35A and fixed to each other. As the fixing means of the plates 33 and 35, for example, there can be employed an adhesion with adhesive agent, welding, caulking, and the like.

In the present embodiment, the plates 33 and 35 also serve as the peripheral wall. Therefore, the plates 33 and 35 can be easily and inexpensively manufactured by drilling the blowout aperture 331 in the plate material and bending the edge.

The representative embodiments of the present invention have been described above, but the present invention is not limited only to these embodiments, and various design changes are possible, and those are included in the present invention.

For example, a screen may be inserted between the plate 13 (23, 33) and the fire extinguishing agent layer 11 (21, 31) to prevent the fire extinguishing agent constituting the fire extinguishing agent layer 11 (21, 31) from peeling off to the outside. As the screen, there may be a wire mesh, a thin paper, a resin sheet, or the like.

EXPLANATIONS OF NUMERALS

1, 2, 3 . . . Fire extinguisher,
11, 21, 31 . . . Fire extinguishing agent layer,
13, 15, 23, 25, 33, 35 . . . Plate,
17, 27 . . . Peripheral wall,
131, 231, 331 . . . Aperture.

The invention claimed is:

1. A fire extinguisher comprising;
a container including:
a fire extinguishing agent layer that comprises a fire extinguishing agent in a solid form and configured to generate aerosol by combustion,
a first plate covering a first surface of the fire extinguishing agent layer and having a blowout aperture for the aerosol, the blowout aperture being a hole that penetrates the first plate, wherein the blowout aperture ejects and directs the aerosol during a discharge of the aerosol, and
a second plate covering a second surface of the fire extinguishing agent layer, which is opposite to the first surface,
wherein the fire extinguishing agent layer is a sheet molded from the fire extinguishing agent, and
wherein the fire extinguishing agent layer is automatically ignited without an ignition device,
wherein the first plate is able to maintain a shape thereof up to a temperature higher than a combustion start temperature of the fire extinguishing agent layer, and
wherein the container is closed except for the blowout aperture.

2. The fire extinguisher in accordance with claim 1, wherein an edge of the first plate and an edge of the second plate is connected to each other.

3. The fire extinguisher in accordance with claim 1, wherein a peripheral wall extending toward the second plate is provided at an edge of the first plate.

4. The fire extinguisher in accordance with claim 3, wherein the first plate and the peripheral wall are made of a metal material or a resin material.

5. The fire extinguisher in accordance with claim 1, further comprising a fixing means for fixing the fire extinguisher to a desired mounting location.

6. The fire extinguisher in accordance with claim 1, wherein the fire extinguishing agent layer contains potassium chlorate and a fire extinguishing agent having a DSC evaluation (100 to 400° C., 10° C. per minute temperature rise) and a total endothermic peak amount of 100 J/g to 900 J/g.

7. The fire extinguisher in accordance with claim 2, wherein a peripheral wall extending toward the second plate is provided at the edge of the first plate.

8. The fire extinguisher in accordance with claim 2, further comprising a fixing means for fixing the fire extinguisher to a desired mounting location.

9. The fire extinguisher in accordance with claim 3, further comprising a fixing means for fixing the fire extinguisher to a desired mounting location.

10. The fire extinguisher in accordance with claim 4, further comprising a fixing means for fixing the fire extinguisher to a desired mounting location.

11. The fire extinguisher in accordance with claim 2, wherein the fire extinguishing agent layer contains potassium chlorate and a fire extinguishing agent having a DSC evaluation (100 to 400° C., 10° C. per minute temperature rise) and a total endothermic peak amount of 100 J/g to 900 J/g.

12. The fire extinguisher in accordance with claim 3, wherein the fire extinguishing agent layer contains potassium chlorate and a fire extinguishing agent having a DSC evaluation (100 to 400° C., 10° C. per minute temperature rise) and a total endothermic peak amount of 100 J/g to 900 J/g.

13. The fire extinguisher in accordance with claim 4, wherein the fire extinguishing agent layer contains potassium chlorate and a fire extinguishing agent having a DSC evaluation (100 to 400° C., 10° C. per minute temperature rise) and a total endothermic peak amount of 100 J/g to 900 J/g.

14. The fire extinguisher in accordance with claim 5, wherein the fire extinguishing agent layer contains potassium chlorate and a fire extinguishing agent having a DSC evaluation (100 to 400° C., 10° C. per minute temperature rise) and a total endothermic peak amount of 100 J/g to 900 J/g.

15. The fire extinguisher in accordance with claim 1, wherein the first plate is made of a metal material.

* * * * *